United States Patent [19]
Bronnert

[11] Patent Number: 4,776,268
[45] Date of Patent: Oct. 11, 1988

[54] APPARATUS FOR STERILIZATION OF LIQUIDS

[76] Inventor: Herve X. Bronnert, 21495 Partridge Ct., Brookfield, Wis. 53005

[21] Appl. No.: 872,135

[22] Filed: Jun. 9, 1986

[51] Int. Cl.$^4$ .............................................. A23C 3/02
[52] U.S. Cl. ....................................... 99/453; 99/483; 99/516; 422/26; 422/307
[58] Field of Search .................. 99/452, 453, 467, 470, 99/471, 483, 473–476, 516, 534; 426/520–522; 239/419, 422–424, 432, 518; 159/4 A; 422/26, 307

[56] References Cited

U.S. PATENT DOCUMENTS

| | | | |
|---|---|---|---|
| 2,899,320 | 8/1959 | Davies et al. | 99/216 |
| 3,032,423 | 5/1962 | Evans | 22/215 |
| 3,156,176 | 11/1964 | Wakeman et al. | 99/251 |
| 3,771,434 | 11/1973 | Davies . | |
| 3,847,714 | 11/1974 | Davies et al. | 159/4 A |
| 4,161,909 | 7/1979 | Wakeman | 99/453 |
| 4,310,476 | 1/1982 | Nahra et al. | 261/118 |
| 4,375,185 | 3/1983 | Mencacci | 99/453 |
| 4,432,276 | 2/1984 | Catelli | 99/453 |

OTHER PUBLICATIONS

A. G. Perkin, "Review of UHT Processing Methods"-/Journal of the Society of Dairy Technology, vol. 38, No. 3, Jul. 1985, pp. 69–73.

Primary Examiner—Timothy F. Simone
Attorney, Agent, or Firm—Ronald E. Barry

[57] ABSTRACT

A method and apparatus for sterilization of liquid food products utilizing a generally cylindrical pressure vessel. The liquid product to be treated is introduced at the top of the vessel in such a manner as to form an insulating barrier of liquid product between the heated interior and any interior surfaces of vessel which the product comes in contact with including the vessel side walls. Steam is introduced through a centrally located diffuser intermediate the top and bottom of the vessel for heating the liquid to a sterilization temperature. A gas removal pipe is provided for removing air and gases released from the liquid product and remaining after condensation of the steam from the lower portion of the vessel. The insulating barrier of liquid product may be formed by the use of a plurality of spray nozzles, by a combination of spray and direct film formation, or by direct film formation alone.

18 Claims, 5 Drawing Sheets

APPARATUS FOR STERILIZATION OF LIQUIDS

BACKGROUND OF THE INVENTION

1. Field of the Invention

The present invention relates to an improved method and apparatus for sterilizing liquid food products through the use of steam infusion.

2. Description of the Prior Art

It has long been recognized that certain food products lend themselves to preservation by the use of heat to sterilize the product. Sterilization destroys bacteria and inactivates most enzymes which cause product spoilage. Additionally sterilization of certain food products may eliminate the need for refrigeration. This is particularly true in the case of dairy products such as milk or ice cream mix, to which this invention is primarily directed, although it may be equally applied to other liquid products such as juices.

In the sterilization of milk, it is necessary to raise the temperature of the milk sufficiently to destroy all bacteria and inactive enzymes which causes spoilage. The rate of destruction or inactivation of these organisms varies with both temperature and the time during which the product is held at an elevated temperature. A preferred method of sterilizing milk and dairy products has been to utilize steam infusion to subject the milk to ultra high temperatures for very short periods of time followed by flash cooling. This has been proven to achieve superior product flavor. Various approaches have been used in the past to accomplish this. For example U.S. Pat. No. 3,156,176 to Wakeman describes a heating apparatus in which steam is supplied into a chamber with the liquid product being introduced in the form of a curtain-like film to expose the fluent product to the elevated steam temperatures. Similarly, U.S. Pat. No. 2,899,320 to Davies and U.S. Pat. No. 3,032,423 to Evans, both utilize apparatus for containing steam in which the product is passed over plates within the steam chamber and heated while the product flows downwardly to a collection point for delivery to a flash chamber. A variation of this method is also described in U.S. Pat. No. 3,771,434 to Davies in which screen panels are used to form a thin film of product for exposure to steam. One major disadvantage of the methods and apparatus described in the foregoing patents is the fact that liquid food products, particularly milk products, have a tendency to burn and collect on heated surfaces which are at temperatures greater than or equal to the temperature of the product itself. Such burning, in addition to fouling the apparatus itself necessitating periodic cleaning, also results in undesirable flavor changes to the milk product.

In an obvious effort to avoid such burn-on and fouling, U.S. Pat. No. 4,310,476 to Nahra and U.S. Pat. No. 4,375,185 to Mencacci attempt to form free falling thin films of milk within a steam atmosphere for raising the product temperature. A problem associated with attempting to form a free falling thin film is that the integrity of such films is very unstable and are subject to splashing or break-up in the presence of moving or circulating steam and gases. Film formation requires close adherence to flow parameters and such devices are also subject to the product burn-on problems when hot surfaces are contacted. Additionally, it is recognized, as discussed in the Nahra patent that physical agitation of milk may also affect the ultimate flavor of the treated product and disturbance of the free falling films will result in such agitation.

Another problem associated with many of the prior art approaches to steam infusion of liquid products is that the devices are not easily cleaned for example with the use of clean-in-place systems. The more internal components in which the product may collect or burn-on, the more difficult the cleaning process.

A further problem which has been recognized in the steam infusion processes is dealing with the presence of entrained gases released from the product when heated and gases, air or oxygen remaining after the steam condenses into the product. As noted by A. G. Perkin, "Review of UHT Processing Methods" journal of the Society of Dairy Technology, Vol. 38, No. 3, July, 1985, gases trapped within the pressure vessel result in increased pressures and greater temperature differences between the steam and product which can again increase the risk of overheating the product and undesirable flavor changes.

Finally, in an effort to reduce burn-on, U.S. Pat. No. 3,771,434 to Davies and the patent to Nahra both suggest the use of cooling mediums in the lower levels of the chambers where the product is collected. The use of cooling jackets, however, reduces the efficiency of the steam chamber by increasing the internal operating pressure and amount of condensation of steam thereby requiring additional quantities of higher temperature steam to make up for such losses. This directly effects the efficiency of the process as well as the flavor of the end product.

SUMMARY OF THE INVENTION

An object of the present invention is to provide an apparatus for sterilizing liquid food products with pressurized steam, in which all or at least a portion of the product to be sterilized is supported and guided to form a continuous flowing film over the entire interior surface of a pressure vessel so that the liquid product itself acts as an insulating barrier between the steam and vessel side wall and no portion of the product is ever in contact with any internal surface hotter or equal to its own temperature.

A further object of the invention is to provide for central introduction of saturated steam into a pressurized vessel to heat a surrounding continuous film of liquid and/or sprayed liquid to be treated and sterilized.

A further object of the invention is to provide for the removal of released air and other gases from the vessel without removal of steam.

The present invention comprises a method and apparatus for sterilizing liquid food products in which the food products are introduced at the top of a pressurized vessel and directed to form a continuous film of liquid which also may be sprayed so as to flow and fall downward along the internal surfaces of the vessel to a collection point. The product itself is used to form a continuous film directly at the top of the vessel along its upper side walls. Either direct flow or spray nozzles may be used to form a continuous insulating flowing film onto the interior vessel side walls, or a combination of spray and direct flow may be employed. Saturated steam is gently diffused centrally through a porous cylinder, to elevate the temperature of the fluid spray and flowing down the internal side walls of the vessel, to heat the liquid film and spray of product by infusion. A concentrically located central tube is provided for removing air and other gases from their natural collection point in the lower area of the vessel interior in order to decrease the differential temperature between the steam and the liquid to be sterilized. The flow pattern of the liquid is such that physical contact with any surface within the vessel which is hotter or equal in temperature to the product is avoided and the product itself serves as an insulating barrier between the steam and components of the vessel.

DESCRIPTION OF THE DRAWINGS

FIG. 10 is a cross-sectional view of the upper portion of an alternate embodiment of a steam infusion heater; and, FIG. 11 is a cross-sectional view of the lower portion of the alternate embodiment shown in FIG. 8.

DESCRIPTION OF A PREFERRED EMBODIMENT

As is seen generally in FIGS. 1 through 4, the infusion heating apparatus includes a vertically upstanding hollow closed vessel 10 having a generally cylindrical central portion 11 and frusto-conical shaped upper and lower portions 12 and 13 respectively. The top of the vessel 10 has a cover plate 14 which seals the upper portion 12 and includes an upstanding central cylindrical collar 15. A second or lower collar 16 is provided with a gasket 17 for sealing the joint between cover 14 and a film forming plate 18. A central cylindrical portion 20 extends downwardly into the interior of the vessel 10 through the collars 15 and 16, gasket 17 and plate 18. Concentrically spaced within the cylindrical portion 20 is a steam delivery pipe 21 forming an insulating air space 22 between cylinder 20 and the steam pipe 21. The lower end of the cylinder portion 20 has a gradually diminishing frusto-conical portion 23 which terminates in a welded sealed joint 24 with the steam pipe 21.

The steam delivery pipe 21 extends through the cylindrical portion 20 downwardly to an internally threaded portion 25 to which is attached a steam distribution cylinder 26 consisting of porous sintered stainless steel. The lower end of the cylinder 26 is sealed by an end cap 27.

Also extending concentrically within the steam delivery pipe 21 is a hollow tube 30 which extends downwardly through the entire length of the delivery pipe 21 and steam distribution cylinder 26, through the end cap 27 and downwardly within the vessel 10 to form a projecting portion 31 terminating within the lower interior portion of the vessel 13.

Figures 1, 2, 7:
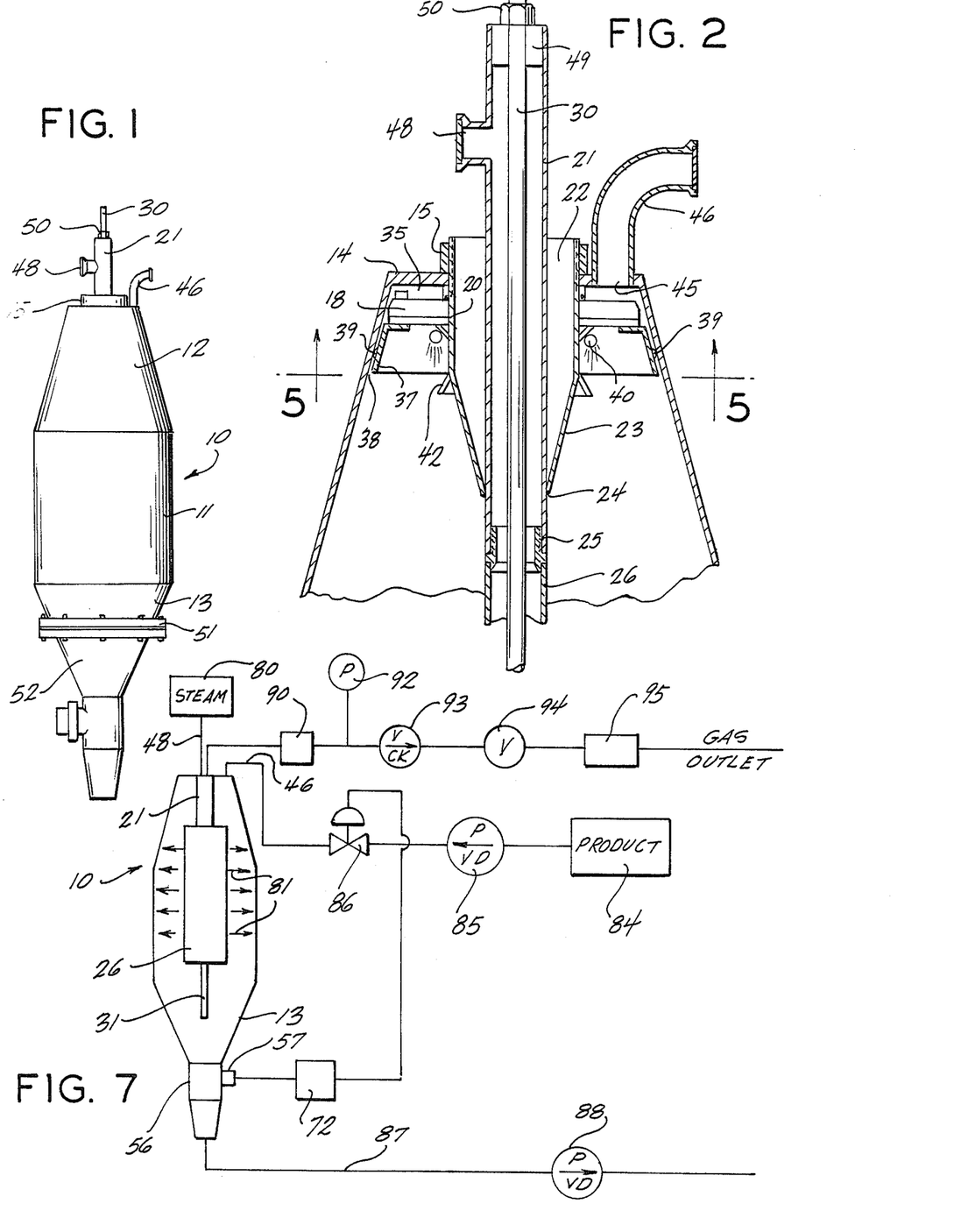
FIG. 1 is an elevation view of an infusion heating apparatus according to the invention.
FIG. 2 is a cross sectional view of the upper portion of the infusion heating apparatus of FIG. 1.
FIG. 7 is a schematic diagram of the infusion heating system according to the invention.
Figure 3:
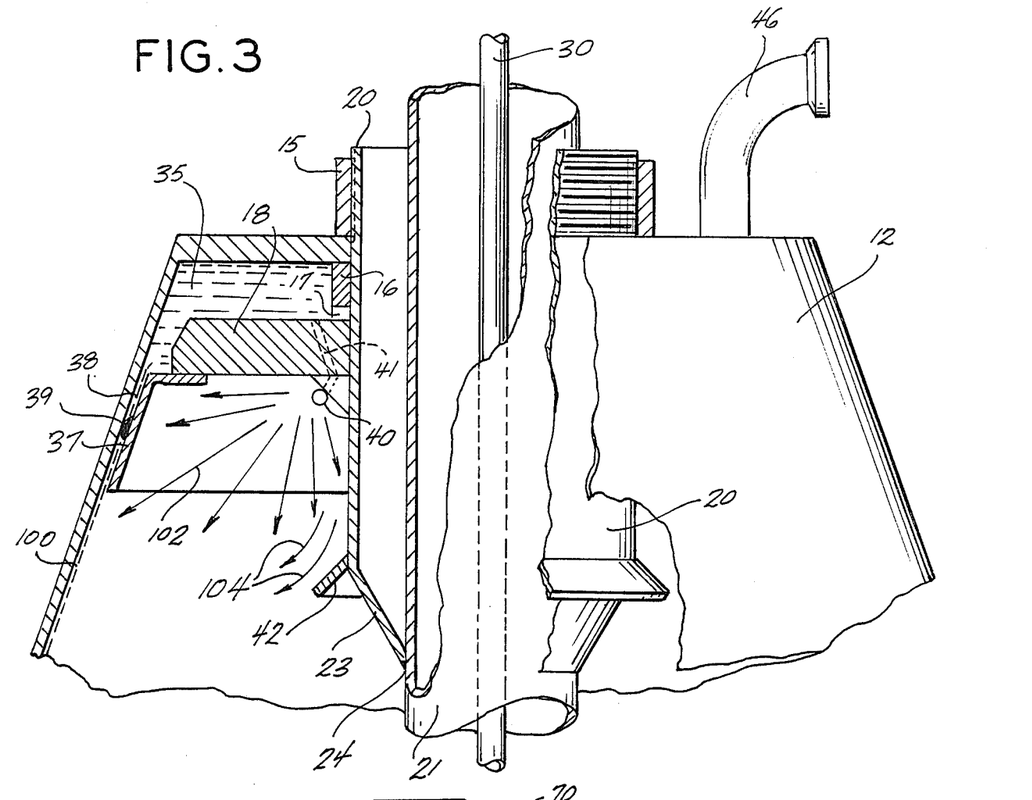
FIG. 3 is an enlarged cross sectional view of the upper portion of the infusion heater of FIG. 1.
Figures 4, 5:
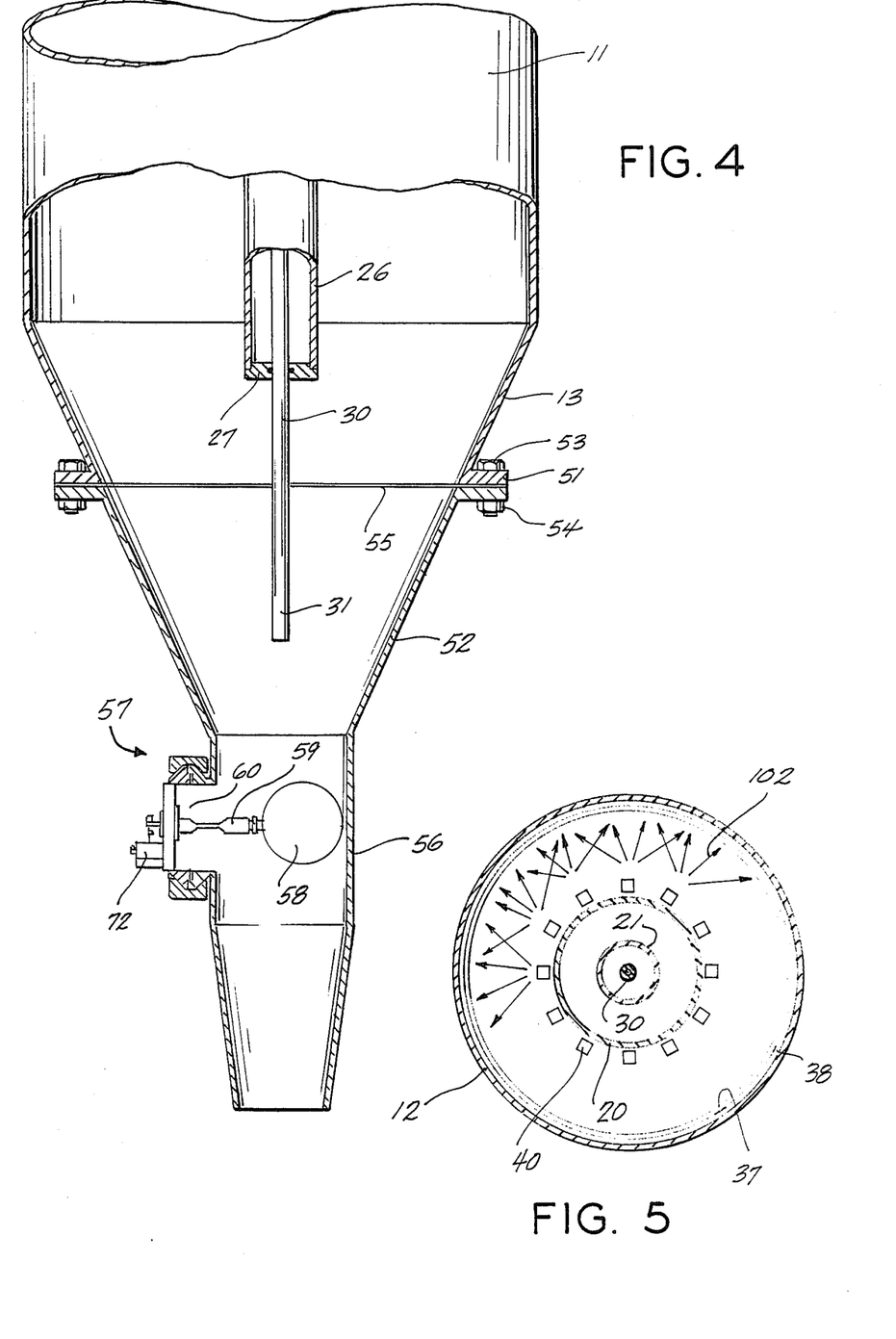
FIG. 4 is a cross-sectional view of the lower portion of the infusion heating apparatus of FIG. 1.
FIG. 5 is a view taken along line 5—5 of FIG. 2.

As shown in FIGS. 2, 3 and 5, the upper interior portion 12 of the vessel 10, has an annular space 35 defined by the side walls of the upper portion 12, the second cylindrical collar 16, the cover 14 and the film forming plate 18 which extends around the cylindrical portion 20 and is spaced downward from the cover plate 14. The outer diameter of the film forming plate 18 is spaced from the side wall of the upper vessel portion 12, and has a frusto-conical teflon coated disc 37 attached to its lower outer edge and shaped so that the sides of the disc 37 extend in close spaced proximity to the interior side wall of the upper vessel portion 12 to form a continuous passageway 38 between annular space 35 and the vessel 10 interior and extending entirely around the upper interior surface of the vessel portion 12. The spaced relationship may be maintained by a plurality of small protuberant members 39 formed around the sides of the disc 37 and extending between the disc 37 and the interior surface of the upper vessel portion 12 as seen in FIG. 3. As is also seen in FIGS. 2, 3 and 5, a plurality of spray nozzles 40 are mounted on the bottom of the plate 18 adjacent to and surrounding tube 20 and have communicating flow passages 41 between the annular space 35 and the nozzles 40. Spaced beneath the nozzles 40 and extending outwardly and downwardly from the central tube 20 is a frusto-conical shaped deflector baffle 42 whose purpose and function will be explained hereinafter. Also extending through the cover 14 is a product inlet aperture 45 to which a supply pipe 46 is attached for introducing liquid product into the annular space 35 as shown in FIGS. 2 and 3.

As seen in FIGS. 2 and 3, the steam supply pipe 21 has a steam inlet pipe 48 for connection to a source of steam in a conventional manner, the details of which are not shown or necessary. The upper end of the pipe 21 outside the cylinder is capped by an end plate 49 through which the air pipe 30 may pass through the use of a conventional pipe fitting 50.

Figure 6:
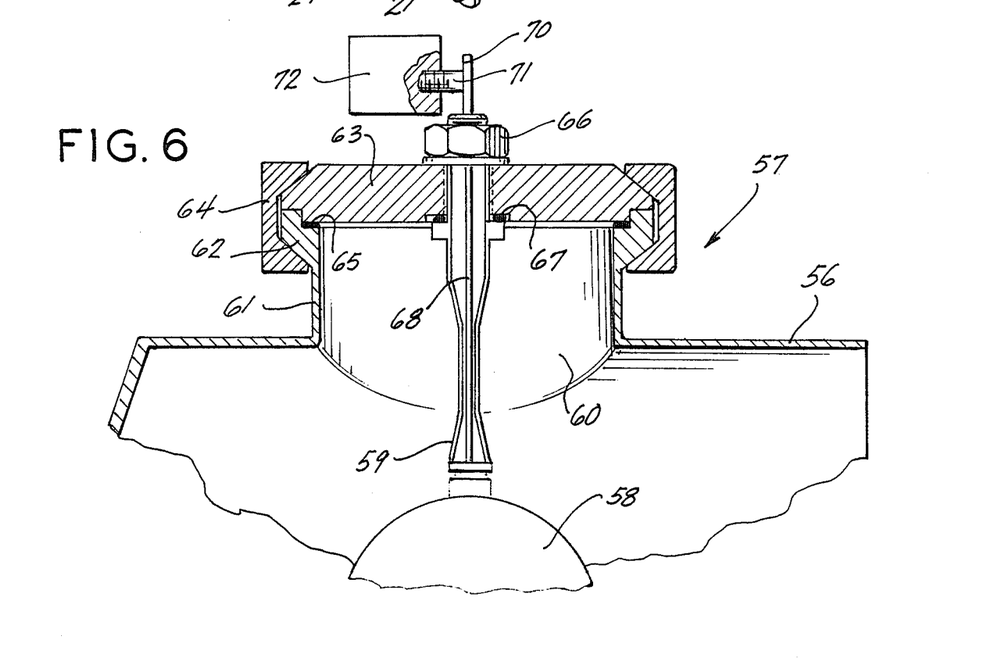
FIG. 6 is an enlarged cross-sectional area view of the level control device in the lower portion of the infusion heater of FIG. 1.

Referring to FIGS. 1 and 4, the lower end 13 of the vessel 10 terminates in a flange 51 to which a second frusto-conical flanged member 52 is attached by conventional means such as bolts 53 and nuts 54 to form a joint sealed by a gasket 55. The lower end of the second frusto-conical member 52 terminates in a cylindrical outlet portion 56 containing a level control apparatus 57 shown in greater detail in FIG. 6. The level control apparatus 57 comprises a hollow spherical member 58 having an attached hollow cylindrical tube 59 extending through an aperture 60 formed in the side of the outlet portion 56. A cylindrical outlet pipe 61 extends around the aperture 60 terminating in a flange 62 to which an end cap 63 is attached in a sealed relationship by means of a clamp 64 and gasket 65 at the joint. Tube 59 extends through the end cap 63 and is secured by means of a nut 66 and held in a sealed relationship with the end cap by means of an O-ring 67. Also, centrally located within the tubular member 59 is an activating rod 68 which is attached at one end to the spherical member 58 and extends through the tube 59 to a terminating point 70 having a downwardly extending plunger 71 attached thereto with the plunger 71 activating a pneumatic transmitter valve 72 whose details are not shown. The spherical member 58 will thus float within a level of liquid at the outlet portion 56 and move upwardly or downwardly with the level. As member 58 moves up or down, it will deflect the activating rod 68 thereby moving the plunger 71 to activate the transmitter valve 72. Details of the transmitter valve are not a part of this invention, but those skilled in the art will appreciate that such valves will typically generate a signal which may be pneumatic, electrical, hydraulic or even mechanical, in response to movement of the plunger 71. The generated signal basically senses level changes, whether positive or negative, and is used to control other devices in response to the level changes.

As will be appreciated by those skilled in the art, other methods of controlling the level of fluid product at the outlet of the vessel have been known and used in infusion heaters. For example, the use of gamma rays emitted to a target have been used to detect the level of fluid within the outlet with sensing devices then being used to adjust the flow controls and rates. Additionally, pressure sensitive diaphragms for sensing differential pressure within the outlet based upon the level of liquid have also been employed to provide signals to flow control devices. These are not described in detail as their features and principles will be appreciated by those skilled in the field.

A schematic depiction of the system is shown in FIG. 7, where the vessel 10 receives saturated steam from a source 80 via the steam inlet 48 which flows into the steam line 21 and is gently diffused into the interior of the vessel 10 through the porous distribution cylinder 26 as indicated by arrows 81. liquid product to be treated from a conventional source 84 is directed by pump 85 through a flow control valve 86 to inlet pipe 46 and is introduced into the vessel 10 as will be described in more detail later. The product is heated by steam infusion as it flows by gravity to the bottom of the vessel 10 where it is collected in the product removal cylinder 56 and removed via an outlet flow line 87 by a pump 88. Signals from the level sensing apparatus 57 control the rate of introduction of product by controlling the flow control valve 86 via the transmitter 72. Air and gases released from the product and condensing steam within the vessel 10, being heavier than steam, flow to the cone bottom 13 of the vessel 10 and are removed by the air outlet line 31 and flow upward through a liquid trap valve 90 which permit only, gases to flow. A pressure gauge 92 is provided for monitoring the pressure of the gases being removed which flow through check valve 93. A manual control valve 94 and flow meter 95 is provided for monitoring and controlling the rate of discharge of air and gases to the atmosphere to avoid discharging of steam from the vessel 10.

Having thus described the basic apparatus, the method of treating product according to the invention will now be described. Since the invention is primarily directed to sterilization of milk products such as ice cream mix, the preferred method will be described with reference to those types of product and with further reference to FIGS. 2 and 3. The liquid mixture is preheated to a temperature of 180° to 185° F. (82° C. to 85° C.) and introduced into the annular chamber 35 via the product supply pipe 46. The product flows from the annular chamber 35 through the passageway 38 and is simultaneously sprayed into vessel 10 by spray nozzles 40. A flowing film of product adhering to the interior sides of the upper vessel 12 forms due to surface tension, the orientation of passageway 38, velocity of flow, and the action of the spray. This forms an initial film 100 of flowing product shown in FIGS. 3 and 8 while at the same time, additional product is sprayed from the nozzles 40 outwardly and downwardly into contact with the film 100 and also into the upper portion of the vessel interior.

Figure 8:
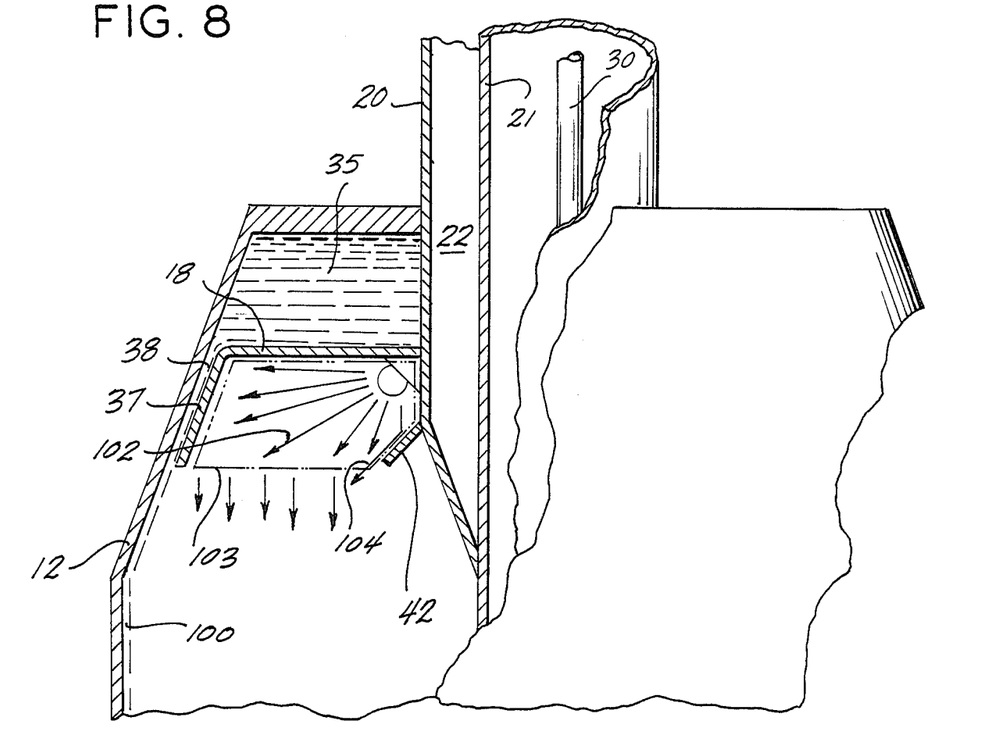
FIG. 8 is a diagrammatic view of the spray and film pattern in the upper portion of the infusion heater according to FIG. 1.

The product spray pattern is best illustrated in FIGS. 5 and 8. The plurality of nozzles 40 arranged around and adjacent to the cylinder 20 spray the product as indicated by arrows 102 outwardly in overlapping finger-like patterns depicted in FIG. 5 as well as downwardly as shown in FIG. 8. The pattern of the spray is extremely concentrated and intense and effectively forms a generally annular area of concentrated spray depicted by phantom line 103 in FIG. 8. This annual space 103 is in the uppermost portions of the vessel 10 and serves as an effective insulating barrier between steam introduced into the vessel below and the top of the vessel 10. This barrier effectively precludes the steam from contacting the upper interior surfaces of the vessel 10 thereby preventing burn-on of the product. The concentrated spray pattern is continually renewed as the droplets of spray fall by momentum and gravity through the interior of the vessel 10 down to the bottom portion 13 or combine with the already flowing film 100 along the sides of the vessel interior walls. The deflector 42 acts to divert the spray outwardly and away from the steam distribution cylinder 26 as indicated by arrow 104 to again avoid burn-on in any of the central portions of the vessel. The flowing product film 100 is initially relatively cool as it flows from the annular space 35 and is gradually heated as it flows down the vessel side walls. The film 100 thus effectively acts as an insulating barrier between the steam and the vessel side walls to prevent the side walls themselves from ever reaching a temperature equal to or in excess of the film itself.

During the process, saturated steam at a temperature of approximately 293° F. (145° C.) is introduced via steam line 21 and diffused gently into the interior of the vessel 10 through the porous distribution cylinder 26. An operating pressure of 45 to 50 pounds per square inch is used, and the diffused steam heats the falling spray droplets and film by infusion, rapidly heating the product to the sterilization temperature. As the steam is absorbed by the product and the product temperature increases, the heavier air and gases released from the product itself and remaining after the steam is condensed will gravitate to the lower end of the vesssel 10. The air removal pipe extension 31 extends within the lower portion 13 of the vessel 10 and provides an outlet for the air and gases at the optimal location. By providing for the removal of such air and gases, the operating temperature and pressure of the steam can be more closely controlled and maintained in proximity to the desired sterilization temperature of the product.

Figure 9:
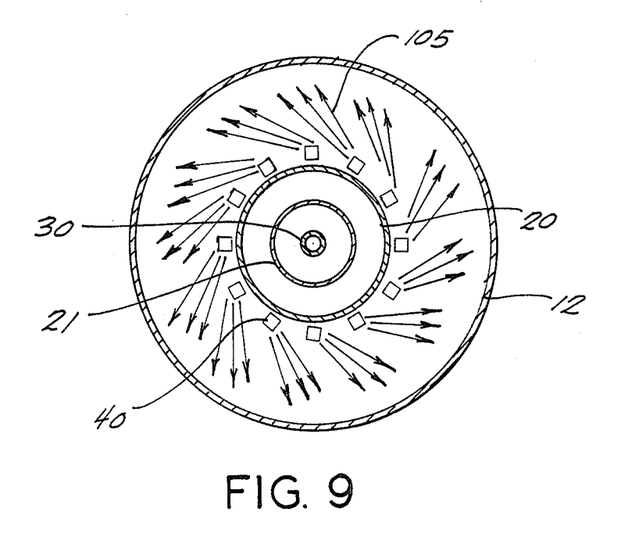
FIG. 9 is a cross-sectional view similar to FIG. 5 with an alternate orientation of spray nozzles.

An alternate orientation of spray nozzles 40 is shown in FIG. 9 where the spray pattern indicated by arrows 105 from each nozzle ranges from generally radial to tangential in direction relative to the cylinder 20. The nozzles 40 are also angled downwardly as well. This orientation provides not only overlapping of the spray patterns but would also creates a generally circular swirling movement of spray within the cooler annular space 103. With this orientation of the nozzles 40, the liquid flowing through passageway 38 may also be directed to emerge in a swirling pattern as well. This could be accomplished through the use of grooves, directional fins or vanes or other devices to impart a swirl to the liquid film in the same general direction of rotation as the spray pattern shown by arrows 105 in FIG. 9.

It will be apparent to those skilled in the field that the method and apparatus thus described is extremely simple, avoids the problem of product burn-on by utilizing the product itself to form an insulating barrier to prevent steam from heating any surfaces contacted by the product itself. This minimizes undesirable changes in flavor of the milk product. Furthermore, by providing an air removal system for removing gases and air from the vessel, a lower temperature difference between the steam itself and the product results which also minimizes flavor changes. The air space 22 between the steam inlet line 21 and the cylindrical portion 20 extending downward from the cover 14 serves as an insulating barrier to prevent heating of the product within the annular space 35, and the initial flowing film layer 100 and spray pattern combined with deflector 42 minimizes the possibility of the product contacting any exposed hot surface within the vessel 10.

The physical characteristics of the spray nozzles and the dimensions of the passageway 38 will vary depending upon the type of fluid product and its viscosity and surface tension. In the case of an ice cream mix, for example, passageway 38 has a dimension of approximately 0.055" (0.14 cm.) and the spray nozzles are configured to release spray droplets of approximately 0.0625" (0.16 cm.) diameter. The shower of droplets in addition to falling directly downward to the bottom of the vessel 10 will also, in part, combine with the flowing film 100 along the sides of the vessel. Due to the high efficiency of heating, ice cream mix, for example, may be processed at the rate of 3,500 gallons per hour with the film introduced at velocities of two to three feet per second of downward flow. The apparatus may also be adjusted to eliminate the flowing film forming passageway 38 and simply fashion the spray nozzles 40 to create the cooler spray barrier at the top of the vessel and also direct spray at a sufficient rate to form the flowing film 100 along the interior vessel walls by use of the spray nozzles 40 alone. These same basic principles will apply as far as the heating and the insulating characteristics of the product to prevent product contact with surfaces hotter than or equal to the product temperature itself. Another alternative is to eliminate the spray nozzles and simply introduce film through the passageway 38 and heat the flowing film alone. The cooler product flowing from the annular chamber 35 will keep the vessel side wall surfaces cooler than the steam itself and also serve to cool the member 37 and again forms a continuous insulating barrier along the interior side walls of the vessel. In this alternative, the steam simply heats the flowing film with no free falling spray droplets.

Figures 10, 11:
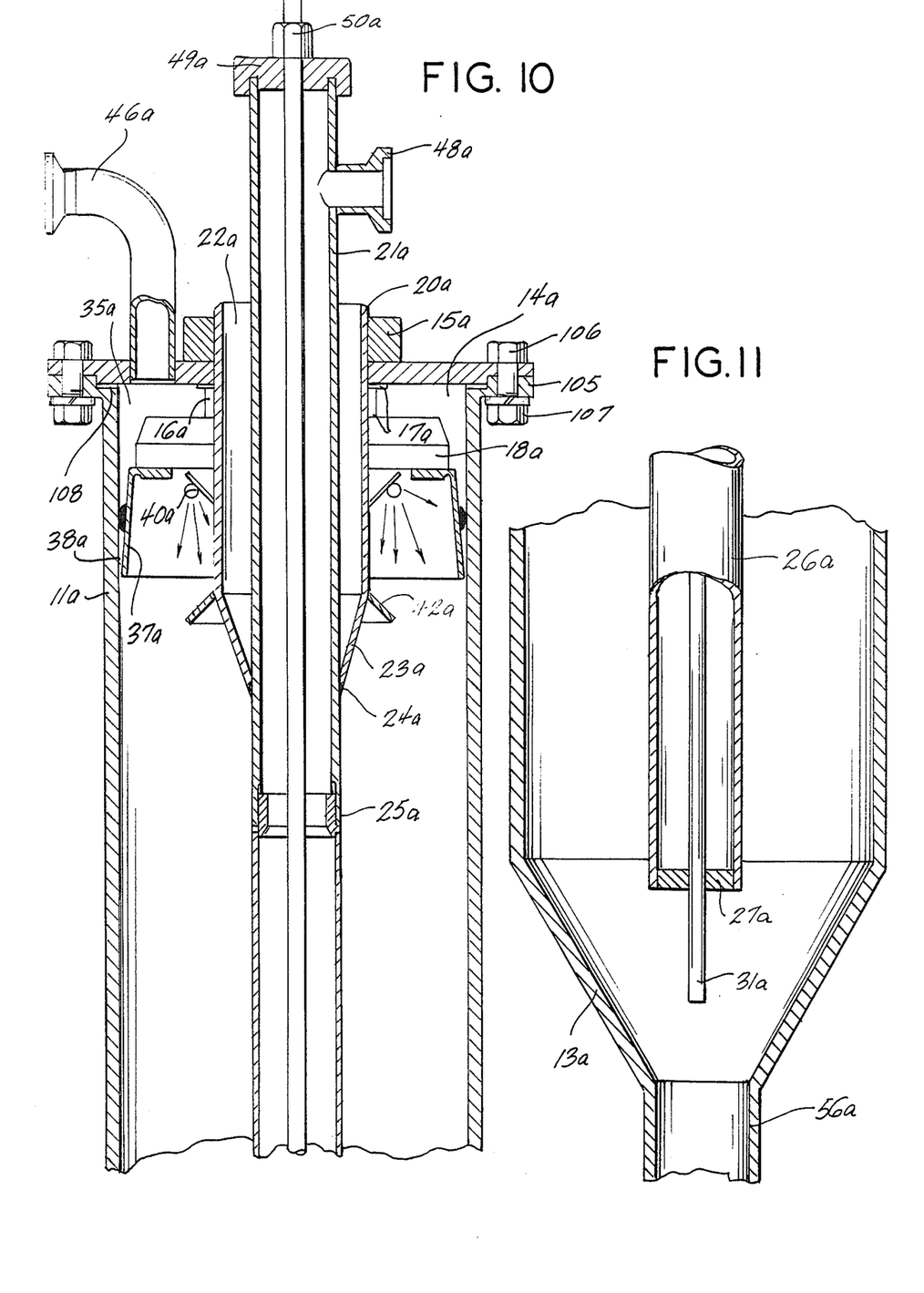

An alternate embodiment of the invention is shown in Figures 10 and 11 which contains certain features common to the vessel of FIG. 1. To the extent that similar components are shown, they are referenced with the same reference numbers used in connection with FIG. 1 with the suffix "a" added. The vessel 10a comprises a cylindrical upper portion 11a and frusto-conical lower portion 13a extending down to the collection point 56a, however, the upper portion of the vessel 10a remains cylindrical and terminates in a flanged upper portion 105 to which the cover 14a is affixed by conventional means such as bolts 106 and nuts 107 with a gasket seal 108 at their joint. Additionally the lower central cylinder 16a has two gasket seals 17a between spacer 16a and the cover 14a and also between the spacer 16a and the film forming plate 18a. All the remaining components are arranged similarly to those shown in FIG. 1 and detailed description is unnecessary.

The alternate embodiment shown in FIGS. 10 and 11, permits the film of product to formed and introduced solely through the use of the film forming plate 18a and disc member 37a and makes the use of the spray nozzles 40a optional. If no spray is used through the nozzles 40a, the film simply flows by gravity and down to the interior side walls due to surface tension, and the direction and velocity of the introduced film. In addition the rate of liquid flow within the annular space 35a and out the passageway 38a serves as a cooling medium. With this alternative design, the spray nozzles may also be used to add product to the flowing film as well as the interior space of the vessel 10 in the same manner as previously described.

Because of the design of the apparatus, it is extremely easily cleaned as the configuration of the vessel and product inlet can in effect become a clean-in-place system. To clean the vessel, it is merely necessary to inject cleaning fluid solutions through the product inlet line 46 into the annular space 35 thereby permitting the cleaning solution to flow through the nozzles 40 and space 38 covering the entire interior of the vessel with cleaning solution.

While the invention has thus been described in relation to a method and apparatus for treating milk, others skilled in the art will appreciate that other food products in liquid form may also be sterilized as well such as flavored milk, half and half, dairy creams, whipping creams, condensed milk, ice cream mix, shake mix, puddings, custard, fruit juices, etc. Adjustments to the operating temperature and flow rates may be necessary but these variations will be recognized and easily addressed by those skilled in the field.

Accordingly, while one preferred embodiment of the invention has thus been described, the scope of the invention is not to be limited thereby but solely based upon an interpretation of the claims which follow.

I claim:
1. An infusion heating apparatus comprising:
   a. a generally vertically disposed hollow pressure vessel having side walls sealed at the top and bottom of said vessel;
   b. product introducing means for introducing a liquid product to be treated at the top of said vessel to form a continuously flowing insulating film of product over the entire interior side wall surfaces of said vessel;
   c. steam dispensing means for dispensing saturated steam into said vessel for heating said product, said dispensing means comprising a porous cylinder located along the central axis of said vessel and being spaced intermediate the top and bottom portions of said vessel and spaced from the vessel side walls;
   d. product removal means for removing the heated liquid product from the bottom of the said vessel and;
   e. gas removal means for removing air and gases from the lower portion of said pressure vessel.

2. An apparatus as set forth in claim 1 wherein said product introducing means includes a substantially annular space extending around the inner perimeter of the top portion of said pressure vessel and including film forming means for forming a continuous flowing film of liquid product covering the interior walls of said pressure vessel.

3. An apparatus as set forth in claim 2 wherein said product introducing means includes a plurality of nozzle means for introducing a concentrated spray of product into the upper level of said pressure vessel in a generally annular zone extending around and spaced from the central axis of said vessel.

4. An apparatus as set forth in claim 3 wherein said steam dispensing means includes steam delivery pipe means for delivering saturated steam from a source to the cylinder, said delivery pipe means extending downwardly from the top of said vessel and spaced from said product introducing means.

5. An apparatus as set forth in claim 4 including deflector means intermediate said product introducing means and said steam dispensing means for deflecting liquid product outwardly away from said steam dispensing means.

6. An apparatus as set forth in claim 5 wherein said product removal means includes level control means for controlling the rate of introduction of liquid product in response to variations in the level of liquid product in the bottom of said vessel.

7. An apparatus as set forth in claim 1 wherein said product introducing means includes a plurality of nozzle means for introducing a concentrated spray of product into the upper level of said pressure vessel in a generally annular zone extending around and spaced from the central axis of said vessel, said nozzle means also being adapted to form a continuously flowing film of product along the interior vessel side walls commencing at top inner portion of said vessel.

8. An apparatus as set forth in claim 1 wherein said steam dispensing means includes steam delivery pipe means for delivering saturated steam from a source to the cylinder, said delivery pipe means extending downwardly from the top of said vessel and spaced from said product introducing means.

9. An apparatus as set forth in claim 1 including deflector means intermediate said product introducing means and said steam dispensing means for deflecting liquid product outwardly away from said steam dispensing means.

10. An apparatus as set forth in claim 1 wherein said product removal means includes level control means for controlling the rate of introduction of liquid product in response to variations in the level of liquid product in the bottom of said vessel.

11. An apparatus as set forth in claim 2 wherein said steam dispensing means includes steam delivery pipe means for delivering saturated steam from a source to the cylinder, said delivery pipe means extending downwardly from the top of said vessel and spaced from said product introducing means.

12. An apparatus as set forth in claim 2 including deflector means intermediate said product introducing means and said steam dispensing means for deflecting liquid product outwardly away from said steam dispensing means.

13. An apparatus as set forth in claim 2 wherein said product removal means includes level control means for controlling the rate of introduction of liquid product in response to variations in the level of liquid product in the bottom of said vessel.

14. An infusion heating apparatus comprising:
a. a generally vertically disposed hollow pressure vessel having side walls sealed at the top and bottom of said vessel;
b. product introducing means for introducing a liquid product to be treated at the top of said vessel to form a continuously flowing insulating film of product over the entire interior side wall surfaces of said vessel;
c. steam dispensing means for dispensing saturated steam into said vessel for heating said product, said dispensing means comprising a porous cylinder located along the central axis of said vessel and being spaced intermediate the top and bottom portions of said vessel and spaced from the vessel side walls;
d. product removal means for removing the heated liquid product from the bottom of the said vessel and;
e. said product introducing means comprises a substantially annular space extending around the inner perimeter of the top portion of said pressure vessel and including film forming means for forming a continuous flowing film of liquid product covering the interior walls of said pressure vessel.

15. An infusion heating apparatus comprising:
a. a generally vertically disposed hollow pressure vessel having side walls sealed at the top and bottom of said vessel;
b. product introducing means for introducing a liquid product to be treated at the top of said vessel to form a continuously flowing insulating film of product over the entire interior side wall surfaces of said vessel;
c. steam dispensing means for dispensing saturated steam into said vessel for heating said product, said dispensing means comprising a porous cylinder located along the central axis of said vessel and being spaced intermediate the top and bottom portions of said vessel and spaced from the vessel side walls;
d. product removal means for removing the heated liquid product from the bottom of the said vessel and;
e. said product introducing means includes a plurality of nozzle means for introducing a concentrated spray of product into the upper level of said pressure vessel in a generally annular zone extending around and spaced from the central axis of said vessel, said nozzle means also being adapted to form a continuously flowing film of product along the interior vessel side walls commencing at top inner portion of said vessel.

16. An infusion heating apparatus comprising:
a. a generally vertically disposed hollow pressure vessel having side walls sealed at the top and bottom of said vessel;
b. product introducing means for introducing a liquid product to be treated at the top of said vessel to form a continuously flowing insulating film of product over the entire interior side wall surfaces of said vessel;
c. steam dispensing means for dispensing saturated steam into said vessel for heating said product, said dispensing means comprising a porous cylinder located along the central axis of said vessel and being spaced intermediate the top and bottom portions of said vessel and spaced from the vessel side walls;
d. product removal means for removing the heated liquid product from the bottom of the said vessel and;

e. said steam dispensing means includes steam delivery pipe means for delivering saturated steam from a source to the cylinder, said delivery pipe means extending downwardly from the top of said vessel and spaced from said product introducing means.

17. An infusion heating apparatus comprising:
a. a generally vertically disposed hollow pressure vessel having side walls sealed at the top and bottom of said vessel;
b. product introducing means for introducing a liquid product to be treated at the top of said vessel to form a continuously flowing insulating film of product over the entire interior side wall surfaces of said vessel;
c. steam dispensing means for dispensing saturated steam into said vessel for heating said product, said dispensing means comprising a porous cylinder located along the central axis of said vessel and being spaced intermediate the top and bottom portions of said vessel and spaced from the vessel side walls;
d. product removal means for removing the heated liquid product from the bottom of the said vessel and;
e. and deflector means intermediate said product introducing means and said steam dispensing means for deflecting liquid product outwardly away from said steam dispensing means.

18. An infusion heating apparatus comprising:
a. a generally vertically disposed hollow pressure vessel having side walls sealed at the top and bottom of said vessel;
b. product introducing means for introducing a liquid product to be treated at the top of said vessel to form a continuously flowing insulating film of product over the entire interior side wall surfaces of said vessel;
c. steam dispensing means for dispensing saturated steam into said vessel for heating said product, said dispensing means comprising a porous cylinder located along the central axis of said vessel and being spaced intermediate the top and bottom portions of said vessel and spaced from the vessel side walls;
d. product removal means for removing the heated liquid product from the bottom of the said vessel and;
e. said product removal means includes level control means for controlling the rate of introduction of liquid product in response to variations in the level of liquid product in the bottom of said vessel.

* * * * *